United States Patent
Lee et al.

(10) Patent No.: US 7,742,140 B2
(45) Date of Patent: Jun. 22, 2010

(54) IN-PLANE SWITCHING MODE LIQUID CRYSTAL DISPLAY DEVICE WITH COMMON VOLTAGE TRANSMISSION WIRE

(75) Inventors: Do-Young Lee, Gumi-si (KR); Byeong-Koo Kang, Gumi-si (KR); Do-Sung Kim, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 39 days.

(21) Appl. No.: 11/169,092

(22) Filed: Jun. 28, 2005

(65) Prior Publication Data

US 2006/0139559 A1 Jun. 29, 2006

(30) Foreign Application Priority Data

Dec. 28, 2004 (KR) ............... 10-2004-0114304

(51) Int. Cl.
*G02F 1/1345* (2006.01)

(52) U.S. Cl. ............... 349/149; 349/58; 349/141

(58) Field of Classification Search ............ 349/141, 349/58–60, 149–152
See application file for complete search history.

(56) References Cited

U.S. PATENT DOCUMENTS

| | | | | |
|---|---|---|---|---|
| 3,925,597 A * | 12/1975 | Misiura et al. | ........ | 174/102 SC |
| 5,396,104 A * | 3/1995 | Kimura | ........ | 257/784 |
| 5,670,994 A * | 9/1997 | Kawaguchi et al. | ........ | 345/206 |
| 5,838,412 A * | 11/1998 | Ueda et al. | ........ | 349/150 |
| 6,034,757 A * | 3/2000 | Yanagawa et al. | ........ | 349/141 |
| 6,396,557 B1 * | 5/2002 | Tajima | ........ | 349/150 |
| 6,411,353 B1 * | 6/2002 | Yarita et al. | ........ | 349/59 |
| 6,515,729 B1 * | 2/2003 | Hoshino | ........ | 349/158 |
| 6,525,786 B1 * | 2/2003 | Ono | ........ | 349/40 |
| 6,597,414 B1 * | 7/2003 | Hasegawa | ........ | 349/40 |
| 6,747,722 B2 * | 6/2004 | Ono et al. | ........ | 349/141 |
| 6,819,389 B2 * | 11/2004 | Imayama et al. | ........ | 349/153 |
| 6,879,367 B2 * | 4/2005 | Ukita | ........ | 349/149 |
| 2001/0033355 A1 * | 10/2001 | Hagiwara | ........ | 349/152 |
| 2004/0070721 A1 * | 4/2004 | Tsubokura et al. | ........ | 349/149 |
| 2004/0160563 A1 * | 8/2004 | Ashizawa et al. | ........ | 349/141 |
| 2004/0183984 A1 * | 9/2004 | Imajo et al. | ........ | 349/151 |

* cited by examiner

*Primary Examiner*—David Nelms
*Assistant Examiner*—Lauren Nguyen
(74) *Attorney, Agent, or Firm*—Brinks Hofer Gilson & Lione

(57) ABSTRACT

An in-plane switching mode liquid crystal display device includes a liquid crystal panel. The liquid crystal panel includes first and second substrates and a liquid crystal layer interposed between the first and second substrates. The first substrate includes a common electrode and a pixel electrode thereon. A top case is mounted over the second substrate and covers the second substrate. A driving unit is connected to the first substrate and outputs a common voltage. At least one common voltage transmission wire is configured to contact an inner surface of the top case and connected to the driving unit. At least one common voltage applying conductor is connected to the common voltage transmission wire and the common electrode.

20 Claims, 5 Drawing Sheets

IN-PLANE SWITCHING MODE LIQUID CRYSTAL DISPLAY DEVICE WITH COMMON VOLTAGE TRANSMISSION WIRE

The present invention claims the benefit of Korean Patent Application No. P2004-0114304 filed in Korea on Dec. 28, 2004, which is hereby incorporated by reference.

BACKGROUND

1. Field of the Invention

The present invention relates to a liquid crystal display device, and more particularly, to an in-plane switching (IPS) mode liquid crystal display device.

2. Description of the Related Art

Liquid crystal display (LCD) devices include an upper substrate, a lower substrate, and a liquid crystal layer interposed between the substrates. The LCD devices further include polarizers and retardation films at outer surfaces of the upper and lower substrates. The polarizers and retardation films are selectively used to change polarization, transmittance and/or refraction direction of a light. Thus, LCD devices having high brightness and contrast may be achieved. The LCD devices may be widely used for notebook computers because of a slim structure and low power consumption.

A twisted nematic ("TN") mode is one type of the LCD devices. The TN mode LCD devices are frequently used but they may not be suitable for a large size display device because a light transmittance in a gray scale varies according to viewing angles. Further, in the TN mode LCD devices, the light transmittance is almost symmetric over a broad range of viewing angles from left and right directions with respect to a center portion of the devices. On the other hand, the light transmittance may not be symmetric at viewing angles from upper and lower directions with respect to the center portion of the devices. Therefore, images may be reversed in a certain range at viewing angles from the upper and lower directions, and viewing angles of the device may be narrowed.

In-plane switching mode liquid crystal display ("IPS-LCD") devices may provide an improved viewing angle. In the IPS-LCD devices, electrodes for driving liquid crystal molecules are formed on the same substrate, and the liquid crystal molecules are driven by an electric field parallel to the substrates. The IPS-LCD devices have improved viewing angle characteristics such as contrast, gray inversion and color shift.

FIG. 1 is a schematic plan view illustrating a pixel of an IPS LCD device 10 according to the related art. In FIG. 1, a gate line 13 and a data line 15 are formed on a substrate and cross each other to define a pixel region P. A pixel electrode 17 and a common electrode 19 are formed in the pixel region P. The pixel electrode 17 and the common electrode 19 are disposed in an alternate pattern as shown in FIG. 1. Although not shown, a thin film transistor is formed at a crossing portion of the gate line 13 and the data line 15. Liquid crystal molecules 21 are driven by an electric field 23 induced between the pixel electrode 17 and the common electrode 19 when voltage is applied to the pixel electrode 17 and the common electrode 19. The electric field 23 is parallel to the substrate.

In the IPS LCD device, the liquid crystal molecules 21 are arranged along the same direction due to the electric field 23 between the pixel electrode 17 and the common electrode 19. The arranged liquid crystal molecules 21 form a domain and multi-domains are formed in one pixel region. As a result, the IPS LCD device may have a wide viewing angle.

FIG. 2 is a schematic cross-sectional view illustrating an IPS LCD device of FIG. 1. In FIG. 2, an upper substrate 29 and a lower substrate 33 are attached with the liquid crystal molecules 21 disposed therebetween. The upper substrate 29 includes a color filter layer (not shown) on an inner surface thereof, and the lower substrate 33 includes pixel and common electrodes (not shown) on an inner surface thereof. A rear electrode 27 is formed on an outer surface of the upper substrate 29, and an upper polarizer 31 is disposed over the rear electrode 27. The rear electrode 27 is formed of a transparent conductive material such as indium tin oxide. The rear electrode 27 cuts off static electricity from the outside and prevents deterioration of image quality.

A lower polarizer 35 is disposed over an outer surface of the lower substrate 33, and a backlight unit 37 is disposed over the lower polarizer 35. The backlight unit 37 includes several optical films such as a diffusion sheet and a prism sheet so that light is uniformly provided all over the surface of the lower substrate 33.

FIG. 3 is a schematic plan view illustrating the IPS LCD device of FIG. 2. In the IPS LCD device, a common voltage, which is also provided to a gate driving unit, is applied to a lower substrate including thin film transistors through a tape carrier package (TCP). In FIG. 3, upper and lower substrates 29 and 33 are attached such that peripheral portions at adjacent two sides of the lower substrate 33 are exposed by the upper substrate 29. A data driving unit 40 and a gate driving unit 42 are connected to the peripheral portions of the lower substrate 33 through tape carrier packages (TCPs) 44 and provide signals to elements of the lower substrate 33. The data driving unit 40 and the gate driving unit 42 may be formed on printed circuit boards (PCBs). The TCPs 44 are flexible and include driver integrated circuits (ICs) 50. The driver ICs 50 output image signals and/or scan signals. In addition, dummy lines may be formed in the peripheral portion of the lower substrate 33.

The data and gate driving units 40 and 42 are folded toward and placed on an outer surface of a top case (not shown) when the top case is combined with the attached substrates 29 and 33.

The data driving unit 40 includes a common voltage generating circuit (not shown). A common voltage Vcom is generated from the common voltage generating circuit and is output to a common voltage output node 52. The common voltage Vcom is applied to the common electrode 19 of FIG. 1 on the lower substrate 33 through the TCP 44. When the top case is combined with the substrates 29 and 33 and the data and gate driving units 40 and 42 are folded toward the outer surface of the top case, the common voltage output node 52 is connected to a common voltage input node 54 of the gate driving unit 42. The common voltage Vcom is also applied to the common electrode 19 of FIG. 1 on the lower substrate 33 through the gate driving unit 42 and the TCP 44.

In the IPS LCD device 10, the TCPs may be disconnected or mismatched with the common electrode during the manufacturing process. Furthermore, contact resistance exists between the TCPs and the lower substrate. Therefore, when the common voltage is applied to the common electrode, signals may be distorted. The distortion of the signals may exacerbate due to parasitic capacitances in pixels on the lower substrate, and a greenish phenomenon or shutdown cross-talk may occur because of imperfect response of the liquid crystal molecules.

SUMMARY OF THE INVENTION

By way of introduction only, in one embodiment, an in-plane switching mode liquid crystal display device includes a liquid crystal panel having first and second substrates and a liquid crystal layer interposed between the first and second substrates, the first substrate includes a common electrode and a pixel electrode thereon. A top case is mounted over the second substrate and covers the second substrate. The in-plane switching mode liquid crystal display device further includes a driving unit connected to the first substrate and outputting a common voltage, at least one common voltage transmission wire on an inner surface of the top case and connected to the driving unit, and at least one common voltage applying conductor connected to the common voltage transmission wire and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the invention, examples of which are illustrated in the accompanying drawings.

Figure 1:
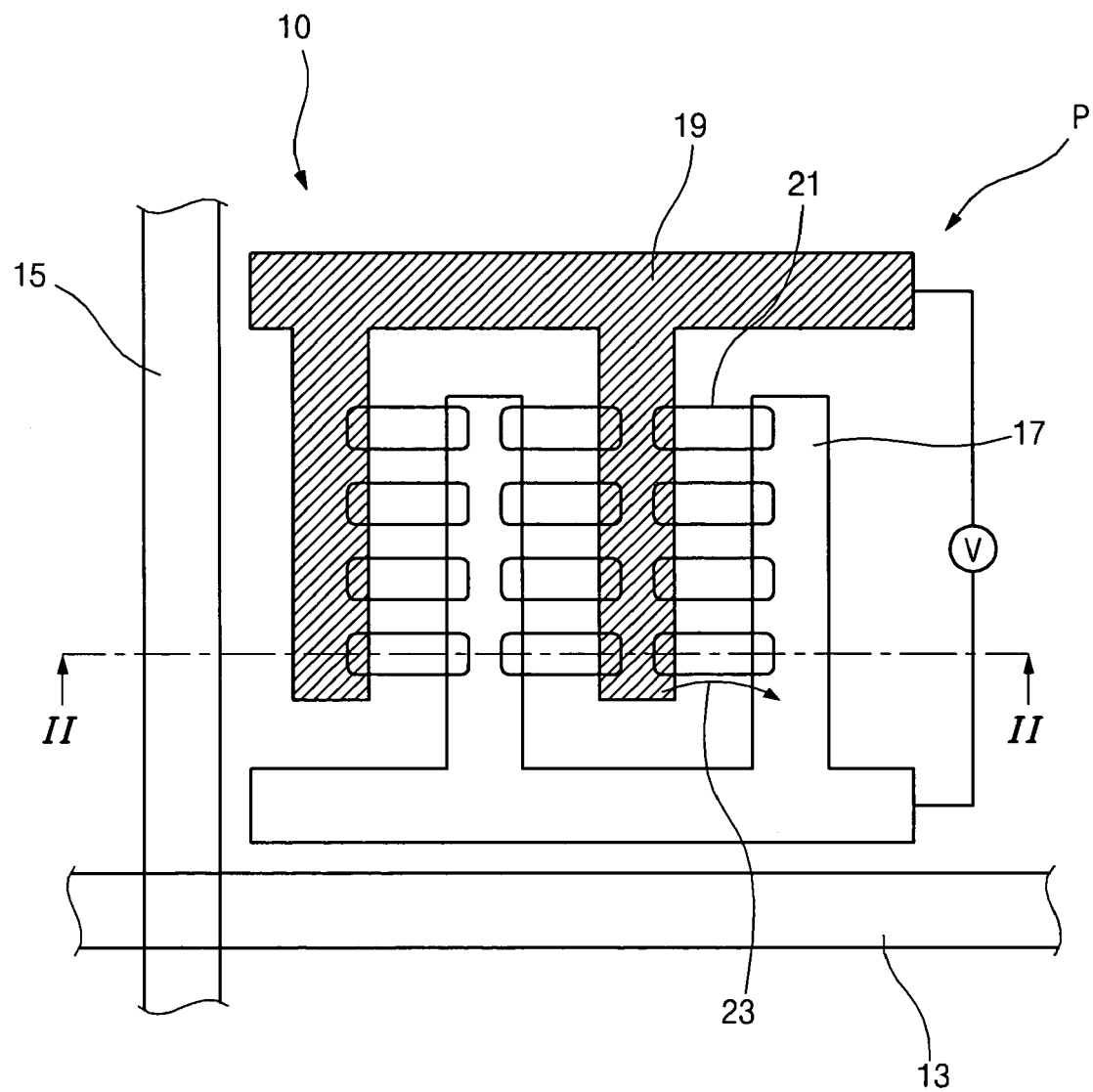
FIG. 1 is a schematic plan view illustrating a pixel of an IPS LCD device according to the related art.
Figure 2:
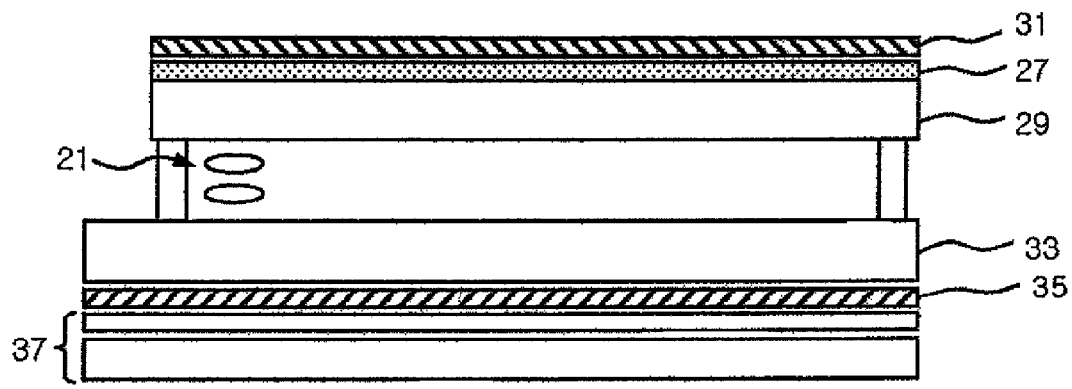
FIG. 2 is a schematic cross-sectional view illustrating an IPS LCD device of FIG. 1.
Figure 3:
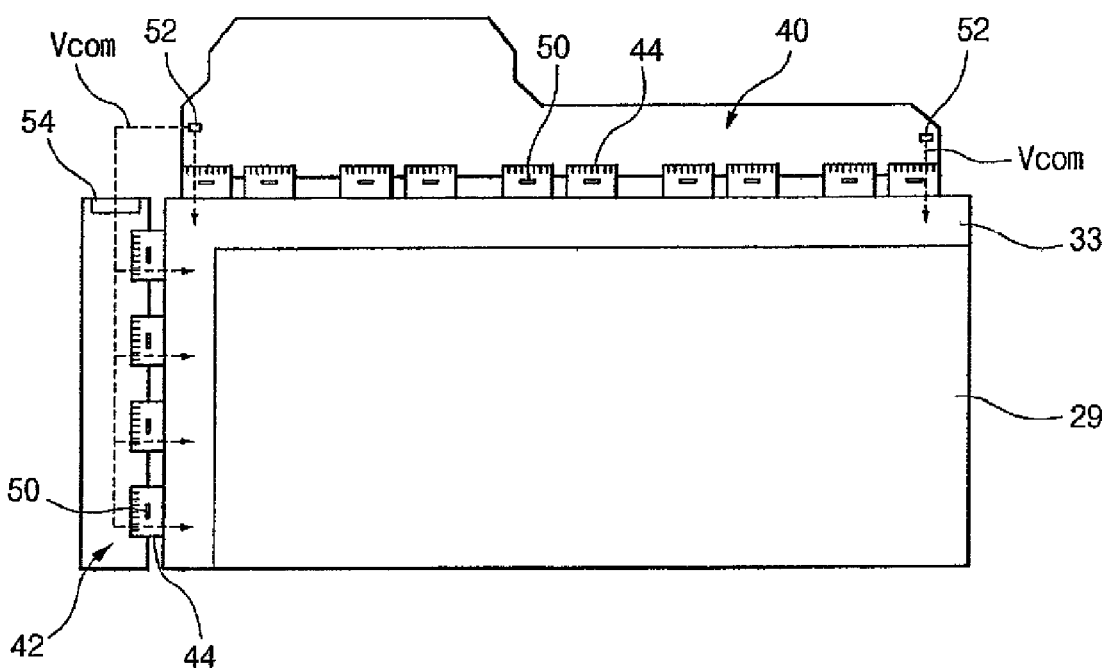
FIG. 3 is a schematic plan view illustrating the IPS LCD device of FIG. 2.
Figure 4A:
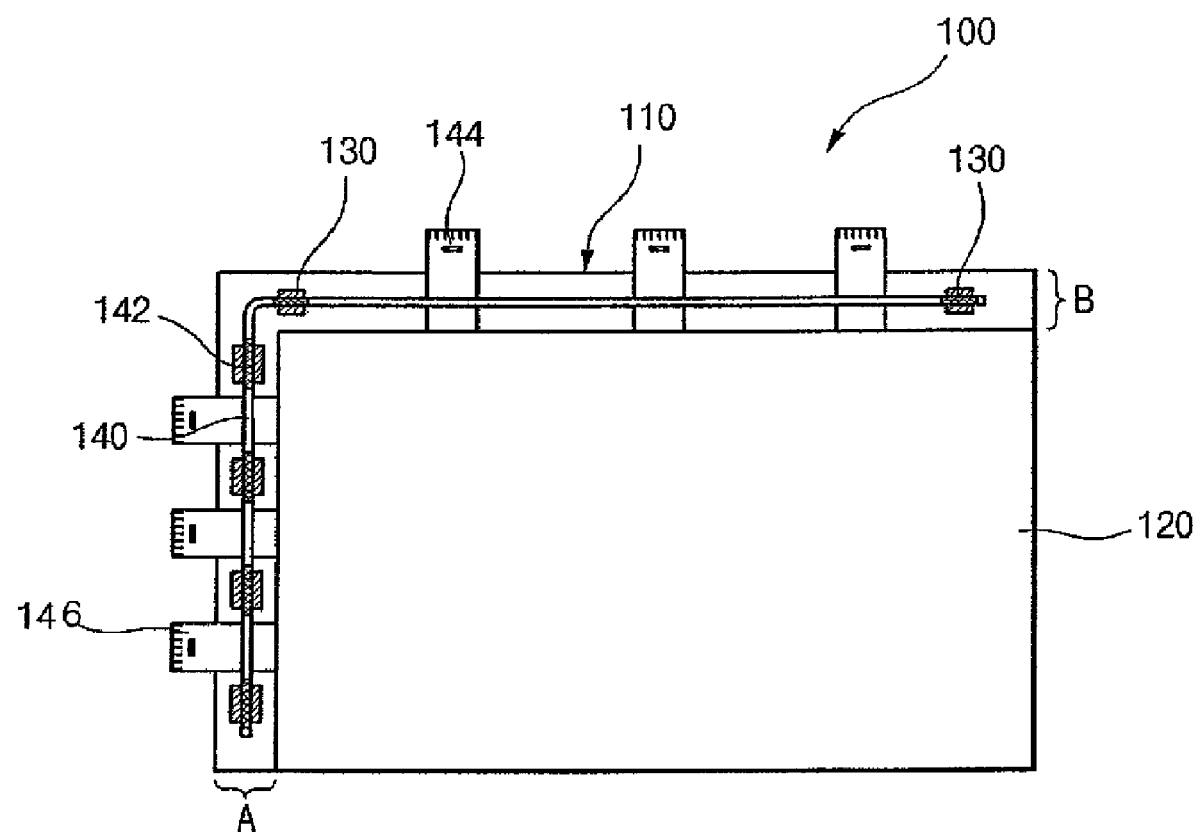
FIG. 4A is a plan view of an IPS LCD device.
Figure 4B:
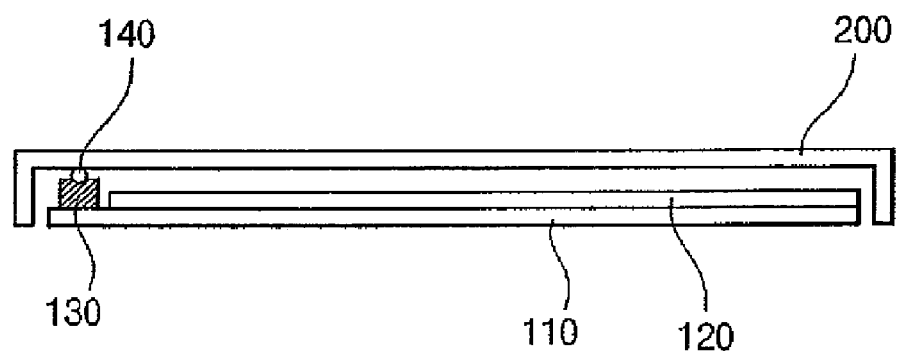
FIG. 4B is a cross-sectional view of the IPS LCD device.

FIG. 4A is a plan view of an in-plane switching mode liquid crystal display (IPS LCD) device 100. FIG. 4B is a cross-sectional view of the IPS LCD device 100. As shown in FIGS. 4A and 4B, a first substrate 110 and a second substrate 120 are attached to each other to thereby form a liquid crystal panel. The second substrate 120 is spaced apart from and disposed over the first substrate 110. Although not shown in the figures, a pixel electrode and a common electrode are formed on an inner surface of the first substrate 110, and a color filter layer is formed on an inner surface of the second substrate 120. The first substrate 110 is larger in size than the second substrate 120, and peripheral portions A and B of the first substrate 110 are exposed below the second substrate 120. The gate and data driving units 146 and 144 are disposed in the peripheral portions A and B of the first substrate 110.

Referring to FIG. 4B, a top case 200 is disposed over the second substrate 120. The top case 200 covers and protects the first and second substrates 110 and 120. Although not shown in the figures, gate and data driving units, for example, placed on printed circuit boards (PCBs) are electrically connected to the first substrate 110 through tape carrier packages. The gate and data driving units are disposed on an outer surface of the top case 200 or an outer surface of the first substrate 110. The data driving unit includes at least one common voltage output node (not shown) for outputting a common voltage.

A common voltage transmission wire 140 is disposed on an inner surface of the top case 200 along the peripheral portions A and B. The common voltage transmission wire 140 is connected to the common voltage output node of the data driving unit. The common voltage transmission wire 140 is a cable that includes a metal core 142 inside and an insulation cover enclosing the core. The insulation cover may be selectively removed, thereby exposing the core 142.

To provide a common voltage through the common voltage transmission wire 140 to common electrodes (not shown) of the first substrate 110, a plurality of common voltage applying conductors 130 are disposed between the common voltage transmission wire 140 and the first substrate 110 and are connected to the exposed core 142 of the common voltage transmission wire 140. The common voltage applying conductors 130 may be formed of metal or other conductive materials. One or more common voltage transmission wire 140 may be used to provide the common voltage with ease.

Figure 5:
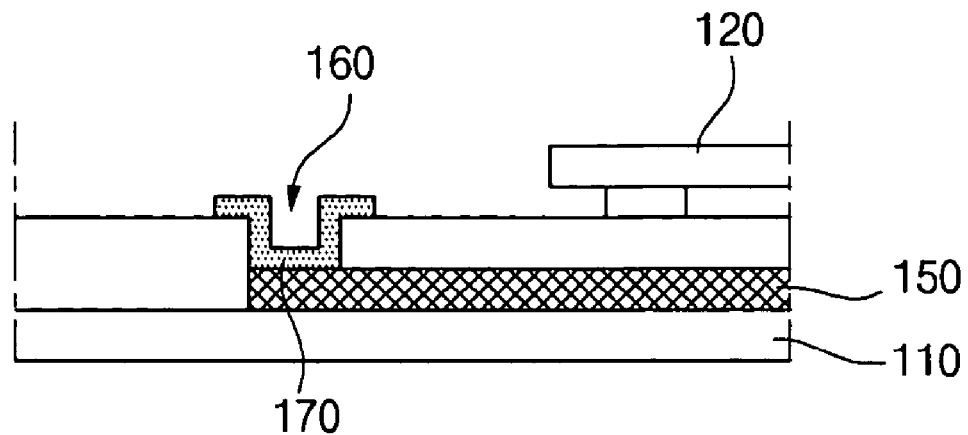
FIG. 5 is a schematic cross-sectional view illustrating a peripheral portion of an IPS LCD device.

A structure supplying a common voltage will be explained. FIG. 5 is a schematic cross-sectional view illustrating a peripheral portion of the liquid crystal display device 100 of FIG. 4A. In FIG. 5, a common electrode 150, more particularly a common line connected to a common electrode in each pixel, is formed on a first substrate 110, and one end of the common electrode 150 is exposed via a contact hole 160. A common terminal 170 is connected to the exposed common electrode 150 through the contact hole 160. The common terminal 170 may be formed with a transparent conductive material such as indium tin oxide. A second substrate 120 is attached to the first substrate 110 such that the common terminal 170 is exposed.

Figure 6:
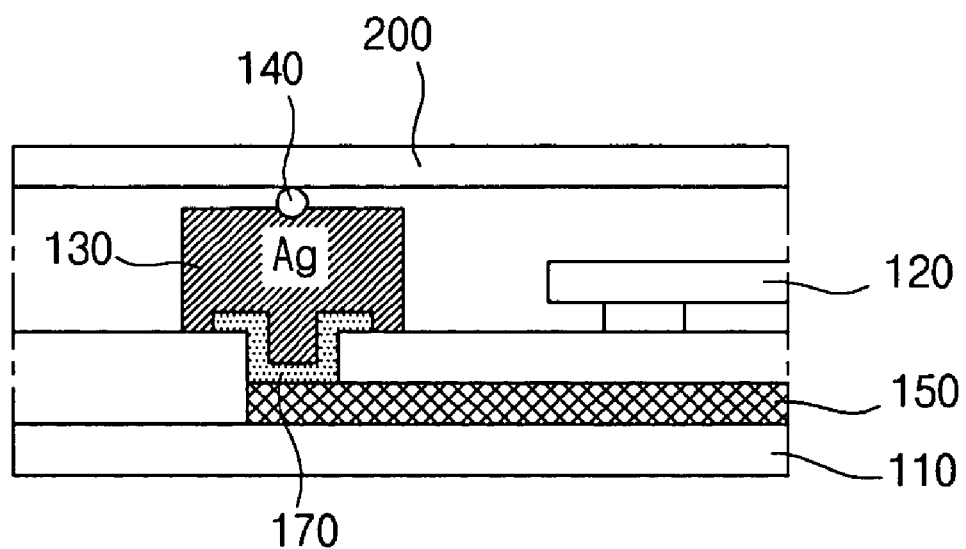
FIG. 6 is another schematic cross-sectional view illustrating the peripheral portion having a common voltage supply structure of the peripheral portion.

FIG. 6 is a schematic cross-sectional view illustrating a peripheral portion having a common voltage supply structure. As illustrated in FIG. 6, the top case 200 is disposed over the liquid crystal panel of FIG. 5, and a common voltage transmission wire 140 is placed to contact an inner surface of the top case 200. As described above, the insulation cover of the common voltage transmission wire 140 may be removed in a portion corresponding to the common terminal 170, thereby exposing the core of the common voltage transmission wire 140. A common voltage applying conductor 130 is interposed between the common terminal 170 and the exposed core of the common voltage transmission wire 140 and is electrically connected to the common electrode 150. The common voltage applying conductor 130 is formed of silver (Ag). Here, the common voltage applying conductor 130 has a thickness substantially as large as the distance between the first substrate 110 and the top case 200, so that the common voltage applying conductor 130 easily contacts the common voltage transmission wire 140.

Accordingly, a common voltage is output from the data driving unit (not shown) and is provided to the common electrode 150 through the common voltage transmission wire 140 and the common voltage applying conductor 130.

One or more common terminal 170 and the common voltage applying conductor 130 may be provided, and the number of the common voltage applying conductors 130 equals to the number of the common terminals 170.

In other embodiment, the common voltage applying conductor 130 may be formed of other conductive materials.

Figure 7A:
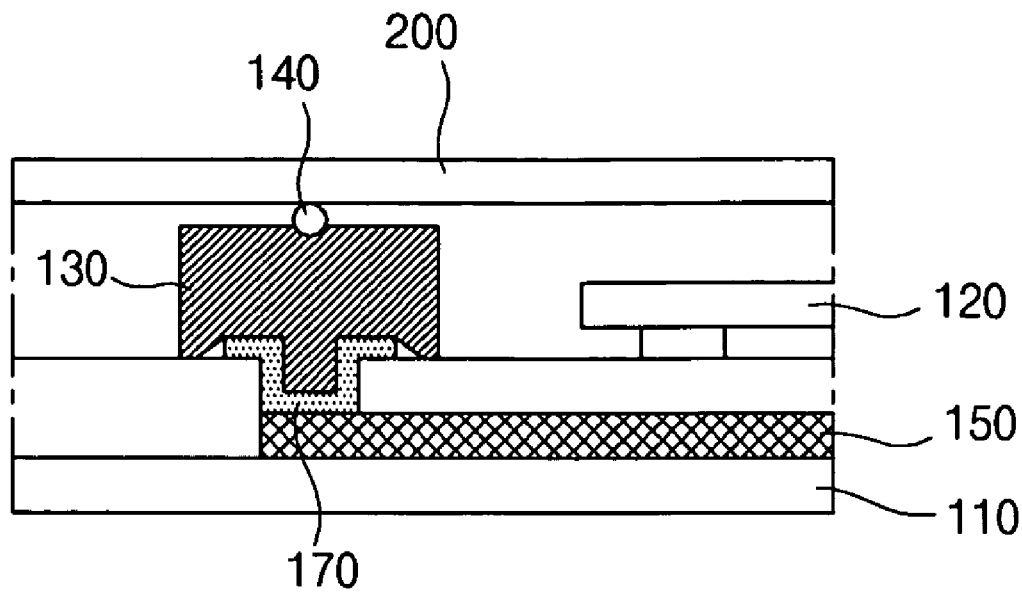
FIGS. 7A and 7B are schematic cross-sectional views illustrating a peripheral portion of IPS LCD device in other embodiments.
Figure 7B:
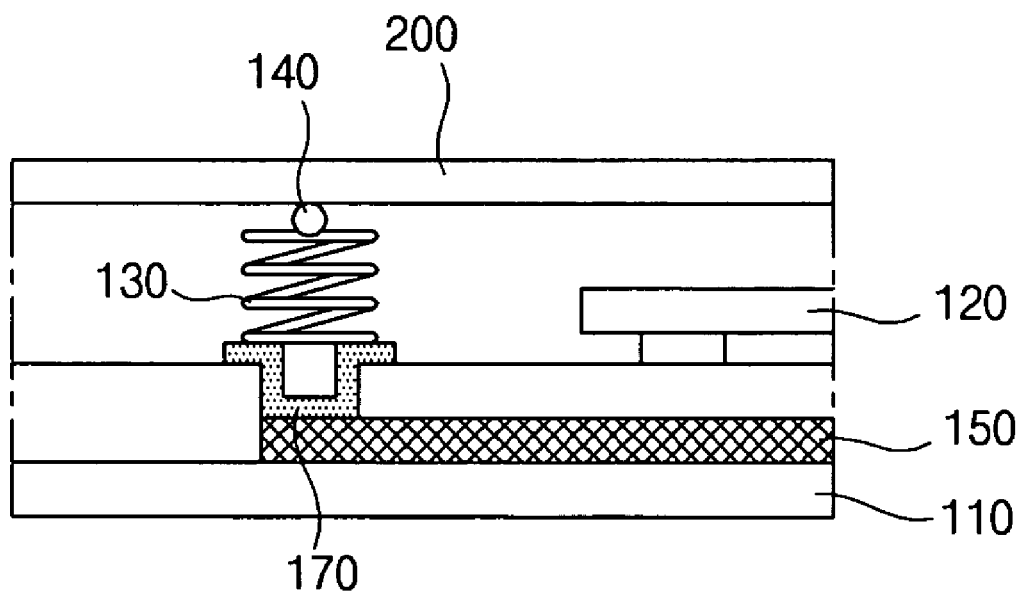

FIGS. 7A and 7B are schematic cross-sectional views illustrating a peripheral portion of IPS LCD devices. In FIG. 7A, the common voltage applying conductor 130 is formed of a sponge covered with a conductive material. In FIG. 7B, the common voltage applying conductor 130 is formed of a metal spring. Alternatively, or additionally, the common voltage applying conductor 130 may be formed of a conductive tape.

The common voltage transmission wire and the common voltage applying conductor have lower contact resistances and high conductivity as compared to the TCP of the related art. The common voltage is prevented from being distorted. Accordingly, the greenish phenomenon and/or the shutdown cross-talk may be improved, and high quality images may be displayed.

It will be apparent to those skilled in the art that various modifications and variations can be made in the in-plane switching mode liquid crystal display device of the present invention without departing from the spirit or scope of the inventions. Thus, it is intended that the present invention covers the modifications and variations of this invention provided they come within the scope of the appended claims and their equivalents.

What is claimed is:

1. An in-plane switching mode liquid crystal display device, comprising:
    a liquid crystal panel including first and second substrates and a liquid crystal layer interposed between the first and second substrates, the first substrate including a common electrode and a pixel electrode thereon;
    a top case over the second substrate and covering the second substrate, the top case having a first surface corresponding to a top surface of the second substrate and a second surface corresponding to a side surface of the first substrate;
    a driving unit connected to the first substrate and operable to output a common voltage;
    a common voltage transmission wire connected to the driving unit; and
    a common voltage applying conductor connected to the common voltage transmission wire and the common electrode, the common voltage applying conductor disposed on a top surface of the first substrate,
    wherein the second substrate is disposed between the first surface of the top case and the first substrate,
    wherein the common voltage transmission wire and the top surface of the second substrate have first and second heights from the top surface of the first substrate, respectively, and the first height is greater than the second height such that the common voltage transmission wire contacts the first surface of the top case,
    wherein the common voltage transmission wire is positioned on a top surface of the common voltage applying conductor.

2. The device according to claim 1, wherein the common voltage transmission wire comprises a metal core and an insulation cover enclosing the metal core.

3. The device according to claim 2, wherein the insulation cover is removed in a portion corresponding to the common voltage applying conductor and the metal core is exposed.

4. The device according to claim 3, wherein the common voltage applying conductor contacts the exposed metal core.

5. The device according to claim 1, wherein the first substrate comprises a peripheral portion configured to be exposed below and beside the second substrate and the common voltage transmission wire is disposed along the peripheral portion.

6. The device according to claim 5, wherein one end of the common electrode is exposed in the peripheral portion and is connected to the common voltage applying conductor.

7. The device according to claim 6, wherein a common terminal is formed between the one end of the common electrode and the common voltage applying conductor.

8. The device according to claim 7, wherein the common terminal is formed of indium tin oxide.

9. The device according to claim 1, wherein the driving unit includes a common voltage output node connected to the common voltage transmission wire.

10. The device according to claim 1, wherein the driving unit is connected to the first substrate through a tape carrier package (TCP).

11. The device according to claim 1, wherein the common voltage applying conductor is formed of one of silver (Ag) and a conductive tape.

12. The device according to claim 1, wherein the common voltage applying conductor is formed of one of a metal spring and a sponge covered with a conductive material.

13. A method for producing an in-plane switching mode liquid crystal display device, comprising:
    supplying a common electrode and a pixel electrode on a first substrate;
    arranging a second substrate to face the first substrate with a liquid crystal layer interposed therebetween;
    mounting a top case over the second substrate, the top case having a first surface corresponding to a top surface of the second substrate and a second surface corresponding to a side surface of the first substrate;
    connecting a driving unit to the first substrate wherein the driving unit is operable to output a common voltage;
    providing a common voltage transmission wire; and
    connecting a common voltage applying conductor to the common voltage transmission wire and the common electrode, the common voltage applying conductor disposed on a top surface of the first substrate,
    wherein the second substrate is disposed between the first surface of the top case and the first substrate,
    wherein the common voltage transmission wire and the top surface of the second substrate have first and second heights from the top surface of the first substrate, respectively, and the first height is greater than the second height such that the common voltage transmission wire contacts the first surface of the top case,
    wherein the common voltage transmission wire is positioned on a top surface of the common voltage applying conductor.

14. The method according to claim 13, wherein arranging the second substrate to face the first substrate comprises exposing a peripheral portion of the first substrate below and beside the second substrate.

15. The method according to claim 14, further comprising disposing the common voltage transmission wire along the peripheral portion.

16. The method according to claim 13, further comprising forming the common voltage applying conductor from one of silver (Ag), a conductive tape, a metal spring and a sponge covered with a conductive material.

17. The method according to claim 13, further comprising forming the common voltage transmission wire with a metal core and an insulation cover enclosing the metal core.

18. The method according to claim 17, further comprising connecting the common voltage applying conductor to the metal core after removing the insulation cover.

19. The method according to claim 13, further comprising supplying a common voltage output node configured to be connected to the common voltage transmission wire.

20. The method according to claim 13, wherein connecting the driving unit to the first substrate further comprises connecting the drive unit to the first substrate through a tape carrier package (TCP).

* * * * *